(No Model.) 2 Sheets—Sheet 1.
J. CLÉRET.
APPARATUS FOR CUTTING PEARL BUTTONS.

No. 450,057. Patented Apr. 7, 1891.

(No Model.) 2 Sheets—Sheet 2.

J. CLÉRET.
APPARATUS FOR CUTTING PEARL BUTTONS.

No. 450,057. Patented Apr. 7, 1891.

Witnesses:
Jona Bleuley.
R. C. Hogue.

Inventor,
Jules Cléret
by Pollok & Mauro
his Attorneys.

UNITED STATES PATENT OFFICE.

JULES CLÉRET, OF BEAUVAIS, FRANCE.

APPARATUS FOR CUTTING PEARL BUTTONS.

SPECIFICATION forming part of Letters Patent No. 450,057, dated April 7, 1891.

Application filed October 29, 1890. Serial No. 369,711. (No model.)

*To all whom it may concern:*

Be it known that I, JULES CLÉRET, of Beauvais, in the Republic of France, have invented a new and useful Improvement in Apparatus for Cutting Pearl Buttons, which improvement is fully set forth in the following specification.

The present invention relates to the construction of apparatus or mechanism for turning pearl buttons or analogous articles, particularly such as have a concave center. Such buttons have been heretofore manufactured by the use of turning-lathes operated by hand or with a carriage bearing the cutting-tool; but the results have not been satisfactory either in respect of the amount of the product, the quality of work, or the economy and facility of manufacture.

In operating with edge-tools upon pearl the extreme hardness of the material speedily dulls the edge and occasions much delay in sharpening. The brittleness of the stock also gives rise to waste and breakage, necessitating the exercise of great care in operating upon the expensive raw material. These and other difficulties that have interfered with the manufacture of pearl buttons by automatic machinery are explained in a concurrent application filed October 29, 1890, Serial No. 369,710.

Figure 1:
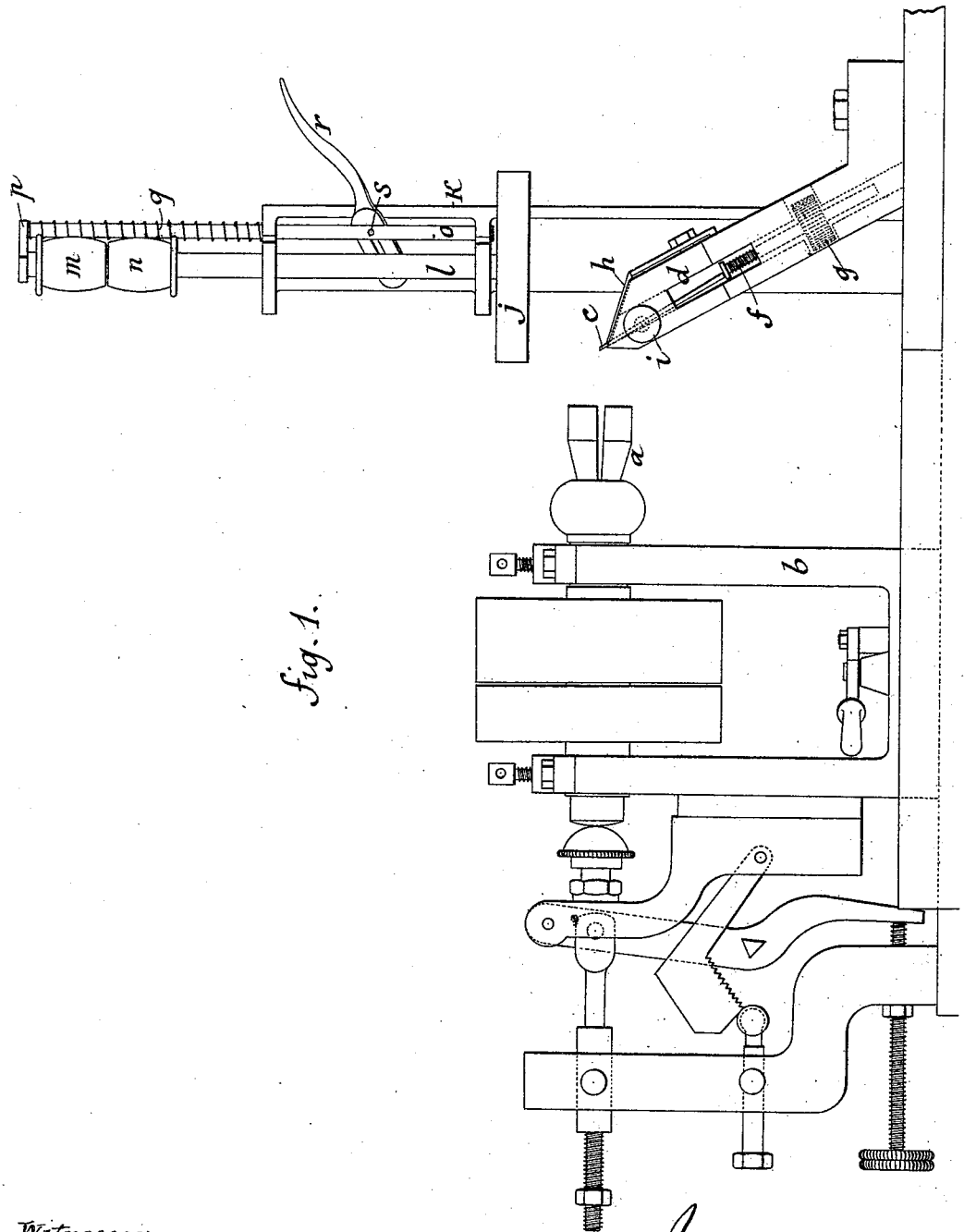
Figure 2:
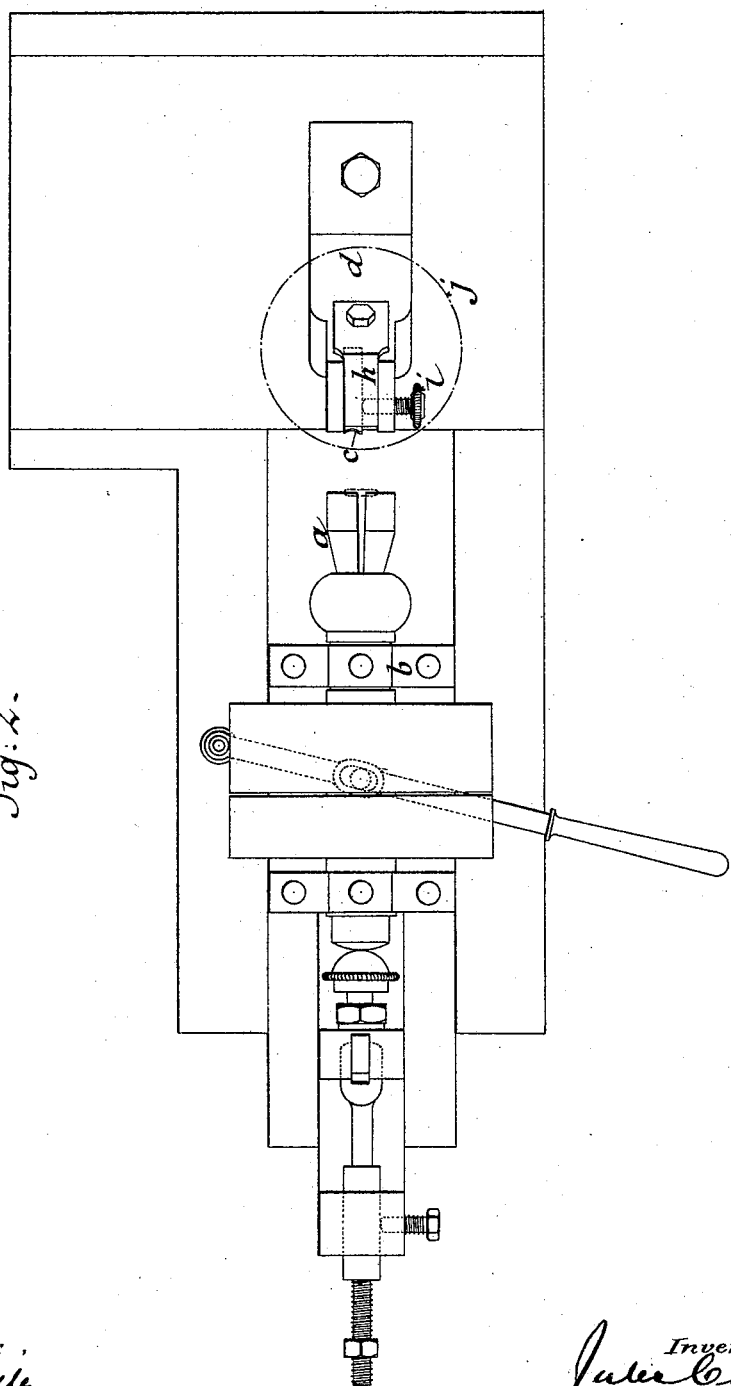

In the accompanying drawings, which form part of this specification, Figure 1 represents in side elevation a machine constructed in accordance with the invention; and Fig. 2 is a plan view thereof, the sharpening mechanism being omitted.

The button-blank to be operated upon is introduced into the chuck-jaws $a$, which are advanced by a carriage $b$. This part of the mechanism is or may be identical in construction with that set forth in the application above referred to, and therefore need not be here described. It forms no part of the present invention, which relates to the construction of the cutting mechanism and to the means for sharpening the cutting-tool without removing the same from the machine or interrupting the operation thereof.

The cutting-tool $c$ is a long and thin bar of steel shaped to correspond with the form to be given to the button and adapted to be advanced as fast as the edge is worn off by use and by sharpening. It is supported in the holder $d$ obliquely with reference to the axis of the chuck $a$, in which position it offers greater resistance and cuts to greater advantage than if supported horizontally, as is usual. The sharpening is effected horizontally or in the plane of the axis of the chuck or a plane parallel therewith, so that the cutting-edge will always present a sharp angle with reference to the plane of inclination of the tool.

Holder $d$ has an opening lengthwise for the insertion and adjustment of the tool, which rests at its end against the head of a screw $f$. A milled-edge nut $g$, engaging with the threads of this screw, serves to adjust the cutting-edge to the proper position. The tool is clamped near its edge against the front of the holder $d$ by a clamp $h$, while a screw $i$ presses its edge against the side of the holder. The tool $c$ is therefore held stationary in operation, while the chuck $a$ advances the button-blank and rotates it against the edge of the tool.

The sharpening device is supported above the tool. It consists of a wheel $j$, of emery or or other suitable material, carried by an arbor $l$, which has bearings in frame $k$, in which bearings it can move vertically. Arbor $l$ carries the fast and loose pulleys $m$ $n$. Parallel with the arbor $l$ is a rod $o$, solidly connected therewith at the upper end by a cross-piece $p$, and around rod $o$ is coiled a spring $q$, which bears at its lower end against the frame $k$ and has sufficient strength to maintain the arbor $l$ and parts connected therewith in their upper position, as shown in Fig. 1. A lever $r$, pivoted to frame $k$, serves to depress the grinding-wheel $j$ and bring it into action by acting upon a pin or lug $s$ upon rod $o$. On releasing the lever the spring $q$ will throw the sharpening-wheel out of action and return the parts to their normal position. During the movement of depression the driving-belt, which is upon the loose pulley $n$, slips onto the fast pulley $m$ by the simple displacement of the shaft. Thus the wheel $j$ is started in operation automatically. The reverse motion of arbor $l$ transfers the belt from the fast to the loose pulley and the wheel $j$ ceases to revolve.

It will be understood that the sharpening of the tool takes but little time and necessitates practically no interruption of the operation of the machine.

I claim as my invention—

1. The combination, with the chuck and its movable carrier, of a stationary tool-holder adapted to support a cutting-tool at an oblique angle with the axis of said chuck and provided with means for adjusting the tool, a sharpening device or wheel movable toward and away from said tool-holder, so as to sharpen the tool without displacement thereof, and operating means for said sharpener, substantially as described.

2. The combination of the stationary tool-holder for supporting a cutting-tool obliquely, a chuck mounted on a carrier movable horizontally toward and away from said tool-holder, and a sharpening-wheel supported above said tool-holder and movable vertically, substantially as described.

3. The combination of the chuck movable horizontally, the stationary tool-holder, the sharpening-wheel normally held out of contact with the tool and carried by an arbor having fast and loose pulleys, and a lever or device for moving said arbor vertically and thereby causing the driving-belt to slip from the loose to the fast pulley when the sharpening-wheel is brought into action, and vice versa, substantially as described.

In testimony whereof I have signed this specification in the presence of two subscribing witnesses.

JULES CLÉRET.

Witnesses:
W. G. FOUIN,
ROBT. M. HOOPER.